UNITED STATES PATENT OFFICE.

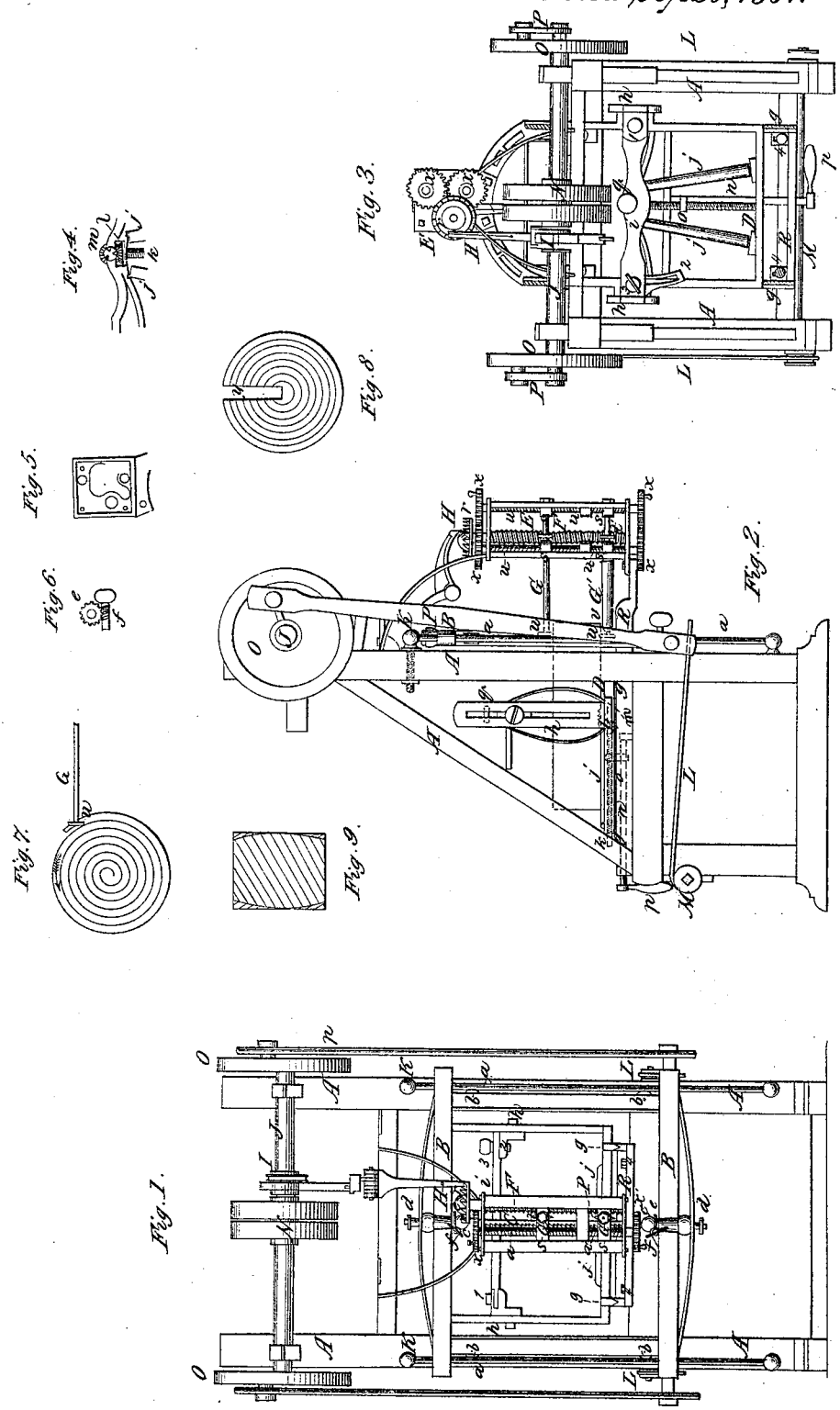

ELIJAH WHITEN, OF HINGHAM, MASSACHUSETTS.

MACHINE FOR SAWING VOLUTES.

Specification of Letters Patent No. 8,400, dated September 30, 1851.

*To all whom it may concern:*

Be it known that I, ELIJAH WHITEN, of Hingham, in the county of Plymouth and State of Massachusetts, have invented a new and improved machine for sawing solid blocks of wood into concentric sheets or into a single spiral sheet or scroll for the purpose of forming nests of pails, buckets, kegs, &c.; and I do hereby declare that the following is a full, clear, and exact description of the same, reference being had to the accompanying drawings, forming part of this specification, in which—

Figure 1 is a front elevation. Fig. 2 is a side view. Fig. 3 is a plan or bird's-eye view. Fig. 4 is a section showing the bevel gear by which the feed motion is given to the carriage. Fig. 5 is a plan of the bottom of the frame in which the mechanical device is placed by which the block is made to rotate and feed to the saw. Fig. 6 is a view of one of the worm wheels and screw by which the proper direction is given the teeth or face of the saw. Fig. 7 is a top view of the block of wood the spiral line showing the direction of the saw cut; the top pinion is seen and shows the manner in which it and also the under pinion operates upon the block. Fig. 8 is a top view of a block that is designed to be sawed into concentric sheets, the concentric circles representing the saw cuts. Fig. 9 is a transverse vertical section of a block with a section of each end chamfered equal to the breadth of the saw.

Similar letters of reference indicate corresponding parts in each of the several figures.

The nature of my invention consists in giving the block to be sawed by a novel mechanical arrangement two motions rotary and rectilinear, whereby the block is fed up to the saw in such a manner as to be when sawed a single spiral sheet or scroll of wood or in concentric layers or sheets.

To enable those skilled in the art to make and use my said invention, I will proceed to describe its construction and operation.

A represents the frame of the machine.

B, is the saw frame, running on suitable guides $a$, $a$, the side pieces of the frame having friction rollers $b$, $b$, set in them which bear against the guides for the purpose of diminishing friction.

C, is the saw placed in the frame as seen in Fig. 1, the upper and lower ends of the saw being secured in the clamps $c$, $c$, said clamps passing through the tubes of the wheels $e$, $e$, in the top and bottom rails of the frame; the ends of the clamps have screws cut on them on which the nuts $d$, $d$, work and by which the saw is strained or tightened in the frame B.

$e$, $e$, Fig. 1, are worm wheels with tubes having square holes through them said tubes set in the top and bottom rails of the frame and the ends of the clamps pass through them as above described.

$f$, $f$, are screws which work into the wheels. These wheels and screws are for the purpose of turning the saw teeth so that the "cut" of the saw may be in the proper direction.

D, is a carriage seen more particularly in Fig. 3. Said carriage runs on the ways $g$, $g$, and has a frame upon it formed of two uprights $h$, $h$, and a cross rail $i$; on the carriage are two friction rollers $j$, $j$, placed obliquely and hung upon centers or pivots. The carriage has also a screw rod $k$, running longitudinally from the cross piece at the back end to a cross piece between the uprights $h$, $h$. This screw rod $k$, has a bevel pinion $l$, seen by the dotted lines in Fig. 2, and in the section Fig. 4. This pinion $l$, meshes into a horizontal bevel pinion $m$. This pinion $m$, has a disk upon it with three studs or points and upon those points the block to be sawed is centered.

$n$, is a rod placed directly underneath the screw rod $k$, and secured to cross pieces on the ways. This rod has an arm $o$, attached to it having a curved recess on its ends with a female screw cut in it, said recess and female screw fitting on the screw rod when it is desired to give motion to the carriage, and turned off when the carriage is to be stationary. The lever $p$, is for the purpose of turning the rod $n$, and consequently the arm $o$. Now it will be seen that as the block is centered on the points on the pinion $m$, and a rotary motion given the block that the carriage D, will move or feed toward the saw C, by means of the bevel gear and the arm $o$, working on the screw rod $k$. The block is secured firmly on the points by the thumb screw $q$, which passes through the rail $i$; the scroll after one revolution of the block bearing or resting on the rollers $j$, $j$, which diminishes the friction in the turning of the block and prevents the extremity of the scroll from falling.

I will now describe the mechanical arrangement by which the block is made to rotate.

E, is a frame formed of four uprights and a bottom and top plate Figs. 1, 2, and 3.

F, is a vertical screw rod placed in the frame having a right and left screw cut upon it, see Figs. 1, and 2. This right and left screw rod is surmounted by a ratchet wheel $r$, which is above the top plate the screw rod projecting through an aperture in the top plate.

G, G', are horizontal rods having their bearings in slides $s, s, s, s$, said slides working in grooves in the uprights of the frame; the rods G G' have pinions $t, t'$, on them which mesh into the vertical screw rod F, more particularly seen in Fig. 2, the upper pinion $t$, working in a thread cut reverse from the thread that the lower pinion $t'$, works in as will be seen in Fig. 2. On the ends of the rods G, G', are toothed wheels, pinions, or spurs $u, u$, see dotted lines in Fig. 2. The block to be sawed is fitted between those pinions or spurs $u, u$, or perhaps more properly speaking the teeth of the pinions or spurs $u\ u$ grasp the edge of the block and as the pinions or spurs $u\ u$ revolve by means of the vertical screw rod meshing into the pinions $t, t'$, the block is made to rotate and it will be seen that the lower pinion $t'$, must have a reverse motion from the upper one $t$, in order to operate the block and this accounts for the right and left screw on the screw rod F. The lower horizontal rod G', is encompassed by a cylinder or friction roller $v$, upon which the scroll as it is cut rests. The horizontal rods G, G', are so arranged as to be brought nearer together or farther apart in order to accommodate blocks of different lengths; this is done by means of screw rods $w, w, w', w'$, which are placed vertically in the frame E and pass through the slides $s, s, s, s$, a female screw being cut in the apertures through the slides in which the screw rods work; the upper screw rods $w, w$, are surmounted by gear wheels $x, x$, above the top plate. The gear wheels meshing into each other and a handle is attached to one of them as seen in the figures. These screw rods $w, w$, operate the upper horizontal rod G; for as the screw rods are turned the slides are raised or lowered; the lower horizontal rod G' is operated upon in a similar manner, the screw rods $w', w'$, having reversed threads and placed directly under the upper ones, the wheels $x', x'$, being below the under plate.

H, is a pawl which turns the ratchet wheel $r$ on the top of the screw rod F. This pawl is operated by means of levers and an eccentric or cam I on the shaft J. Various means however may be devised for driving the screw rod F, to which the ratchet wheel is attached.

Fig. 7 is a section showing the upper toothed pinion $u$, acting upon the block it will be seen that the pinion as it causes the block to rotate has a tendency to draw the scroll or sheet of wood out as it is sawed from the block and thus the saw cut or gap is kept free or open and the wood does not bind or press upon the saw, the lower pinion $u$ of course acts in the same way. I am enabled thereby to give a rapid motion to the saw without heating it; this is an important item. The lower plate of the frame seen in Fig. 5 has a flange or projection upon it which sets over a bow or curved end of the ways $g, g$. This plate is secured by bolts to the bow or curved end which has holes or slots through it, so that the frame E may be secured in the desired position. (See Fig. 3.) The bed R, on which the ways $g, g$, are placed may be moved forward or backward on the frame and is secured by bolts 4, 4, as seen in Fig. 3. By this means the relative position of the pinions or spurs $u, u$, to the saw may be changed or fixed as desired. For instance in sawing their stuff the spurs may rest upon the solid portion of the block by moving the bed R, and the frame E. The two motions necessary to be given the block in order that it may be sawed into scroll spiral or concentric sheets have been described and also the manner in which I produce these motions. The ratchet wheel $r$, being turned by the pawl H, or its equivalent, operates the horizontal rods G, G', the pinions or spurs $u, u$, revolving and grasping the edge of the block causing it to rotate and at the same time opening the saw cut or gap preventing unnecessary friction upon the saws. The block as it rotates operates the bevel wheels $l, m$, and screw rod $k$, by being confined to the points on the bevel wheel $m$, by the pressure of the thumb screw $q$ in the rail $i$, by which, with aid of the arm $o$, the carriage D, and block is moved or fed toward the saw, the speed of the carriage depending upon the inclination of the thread on the screw rod $k$. It may be proper to state that by throwing the arm $o$, off the screw rod $k$, the block may be sawed into concentric sheets as seen in Fig. 8, the circles representing the saw cuts or gaps. In order to do this a recess $y$, must be cut out of the block for the saw to enter and at every revolution of the block the carriage D, must be moved forward either by hand or otherwise the distance of the thickness of the sheet to be sawed.

In cases where it is desired to take the core from the center of the block, the arm $o$, is thrown out of gear with the screw rod $k$, and the motion of the carriage D, is consequently stopped. The saw will then cut in a circle, leaving a solid core in the center of the block. By loosening the screw *q*, and by drawing back the rail *i*, the core may be removed from the center of the block. Pails as is well known are generally of conical form, and if the scroll of wood sawed is to be converted into pails and such articles it should be sawed conical. This is done in the following manner: The upper ends of the guides *a*, *a*, fit in the heads of the set screws K, K, said set screws passing through the uprights of the frame as seen in Fig. 2, each set screw has two nuts upon it, *z*, *z*, one each side of the frame. These set screws may be screwed out from the uprights and secured at any point by the nuts *z*, *z*, by which the saw frame and saws may be set at the required angle with the vertical, and consequently the block will be sawed into a scroll of taper or conical form. It may also be sawed conical by canting the block by means of the rail *i*, which is movable as will be seen by referring to Fig. 3, a pivot 1, being at one end which allows the opposite end to vibrate over a curved arm 2, having a slot in it, the rail *i*, being secured in the desired position by a screw 3, which binds the end of the rail firmly down upon the arm 2, by moving the rail *i*, backward the block may be canted, by raising the screw *q*, and when in the desired position the screw is again pressed upon it and the rail *i*, secured.

L, represents the spring, Figs. 1, 2, and 3, which acts upon the under or lower rail of the saw frame. This acts as an equalizer and prevents a tremor or vibration of the machine when running the saw with a rapid motion. A rapid motion is essential not only on the score of economy, but in many cases owing to the different kinds of wood the saw is liable to be turned out of its proper direction, and follow the grain of the wood.

I have experimented with heavy "flies" and also in other ways but was not successful until I employed the spring. Its construction will be readily seen by refering to Fig. 2. It is formed merely of two metallic rods coiled around the ends of a bar or cross piece M, at the back of the frame of the machine, the end of the rods bearing against the under rail of the saw frame, there being one rod on each side of the machine as seen in Figs. 1, and 3.

N, is the driving pulley on the shaft J; O, O fly wheels to which the pitmans P, P, are attached which drives the saw's frame.

The blocks may be sawed so that the spiral sheet or scroll will be similar to a keg in shape, merely by chamfering a section of each end of the block equal to the width of the saw as seen in Fig. 9, so that the saw will get the proper curve when starting, it will then maintain that curve throughout till the block is sawed. In order to saw the blocks in the manner described two motions are absolutely necessary, viz; the rotary motion of the block, and the rectilinear motion given the block by the carriage. The spiral sheets or scrolls are formed into pails, buckets, &c., with but little or no waste of stock besides the saw cut or gap, there being generally but one joint to the pail or keg.

I do not claim the carriage D; for carriages have been, and are now applied to saw mills but What I do claim as new and desire to secure by Letters Patent, is—

The manner in which I produce the two motions necessary to be given to the block in order that it may be sawed in the required from, viz; the screw rod F, with its right and left screws cut upon it meshing into the pinions *t*, *t'*, by which motion is communicated to the horizontal rods G, G', the toothed wheels, pinions, or spurs *u*, *u*, grasping the edge of the block and causing it to rotate in combination with the bevel pinions *l*, *m*, screw rods *k*, and arm *o*, by which a rectilinear motion toward the saw is given the carriage and block, producing the result described.

ELIJAH WHITEN.

Witnesses:
S. H. WALES,
R. W. FENWICK.